(12) United States Patent
Yuan et al.

(10) Patent No.: US 11,442,299 B2
(45) Date of Patent: Sep. 13, 2022

(54) DISPLAY MODULE, DISPLAY DEVICE AND VIEWING-ANGLE SWITCHING METHOD

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Pan Yuan, Beijing (CN); Sijun Lei, Beijing (CN); Liang Gao, Beijing (CN); Xianyong Gao, Beijing (CN); Yansheng Sun, Beijing (CN); Yunsong Li, Beijing (CN); Zhicai Xu, Beijing (CN); Yong Long, Beijing (CN); Ying Zhang, Beijing (CN); Dengqian Li, Beijing (CN); Guojian Zhang, Beijing (CN); Fanjian Zeng, Beijing (CN); Shanbin Chen, Beijing (CN); Sen Tan, Beijing (CN); Hebing Ma, Beijing (CN); Chaojie Zhang, Beijing (CN); Song Liu, Beijing (CN); Xinzhi Shao, Beijing (CN); Yong Deng, Beijing (CN); Xiangchao Chen, Beijing (CN); Genchuan Yan, Beijing (CN); Ying Yang, Beijing (CN); Xinyu Wang, Beijing (CN)

(73) Assignees: Chongqing BOE Optoelectronics Technology Co., Ltd., Chongqing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/265,546

(22) PCT Filed: May 13, 2020

(86) PCT No.: PCT/CN2020/089948
§ 371 (c)(1),
(2) Date: Feb. 3, 2021

(87) PCT Pub. No.: WO2020/233463
PCT Pub. Date: Nov. 26, 2020

(65) Prior Publication Data
US 2021/0294133 A1   Sep. 23, 2021

(30) Foreign Application Priority Data

May 17, 2019   (CN) .......................... 201910413499.1

(51) Int. Cl.
*G02F 1/1334* (2006.01)
*G02F 1/13* (2006.01)
(Continued)

(52) U.S. Cl.
CPC .......... *G02F 1/1323* (2013.01); *G02F 1/1334* (2013.01); *G02F 1/1339* (2013.01);
(Continued)

(58) Field of Classification Search
CPC ............. G02F 1/1323; G02F 1/133305; G02F 1/1334; G02F 1/13362; G02F 1/1339; G02F 1/13439; G02F 1/13476
See application file for complete search history.

(56) References Cited

U.S. PATENT DOCUMENTS 10,082,614 B2   9/2018   Bang et al.
2005/0190333 A1*  9/2005  Wu ........................ H05K 1/118
                                                        349/150
(Continued)

FOREIGN PATENT DOCUMENTS

CN        1632661 A     6/2005
CN     1010042490 A     9/2007
(Continued)

OTHER PUBLICATIONS

104932110 A (Chen, Yu-Wei et al.) machine translation (Year: 2015).*

(Continued)

*Primary Examiner* — James A Dudek
(74) *Attorney, Agent, or Firm* — Chiwin Law LLC (57) ABSTRACT

Disclosed are a display module, a display device and a viewing-angle switching method. The display module includes a backlight module, a display panel, a lower polarizer sheet, a viewing-angle switching element and a transparent cover plate; the viewing-angle switching element and the transparent cover plate are arranged between the display panel and the lower polarizer sheet, and the transparent cover plate is arranged on a side of the viewing-angle switching element that is close to the lower polarizer sheet; the backlight module is configured to supply light that meets a preset condition, the viewing-angle switching element is configured to switch viewing-angle modes of the display module; the viewing-angle modes include; a first viewing-angle mode and a second viewing-angle mode; and a viewing-angle range of the first viewing-angle mode is smaller than a viewing angle range of the second viewing-angle mode.

19 Claims, 7 Drawing Sheets

(51) Int. Cl.
| | | |
|---|---|---|
| | *G02F 1/1333* | (2006.01) |
| | *G02F 1/13357* | (2006.01) |
| | *G02F 1/1339* | (2006.01) |
| | *G02F 1/1343* | (2006.01) |
| | *G02F 1/1347* | (2006.01) |

(52) U.S. Cl.
CPC ...... *G02F 1/13362* (2013.01); *G02F 1/13439* (2013.01); *G02F 1/13476* (2013.01); *G02F 1/133305* (2013.01)

(56) References Cited

U.S. PATENT DOCUMENTS

| | | | |
|---|---|---|---|
| 2005/0206814 A1* | 9/2005 | Histake | G02F 1/1323 349/112 |
| 2007/0222915 A1* | 9/2007 | Niioka | G02F 1/133509 349/62 |
| 2008/0100789 A1* | 5/2008 | Kamiya | G02F 1/133305 349/149 |
| 2009/0310064 A1 | 12/2009 | Choe et al. | |
| 2018/0059451 A1 | 3/2018 | Jeon et al. | |
| 2019/0331944 A1* | 10/2019 | Fang | G02F 1/13363 |

FOREIGN PATENT DOCUMENTS

| | | |
|---|---|---|
| CN | 104266116 A | 1/2015 |
| CN | 104932110 A | 9/2015 |
| CN | 106932854 A | 7/2017 |
| CN | 107664871 A | 2/2018 |
| CN | 107797342 A | 3/2018 |
| CN | 108897169 A | 11/2018 |
| CN | 208126055 A | 11/2018 |
| CN | 109725448 A | 5/2019 |
| CN | 110068946 A | 7/2019 |
| CN | 106090730 A | 11/2019 |
| JP | 2004303578 A | 10/2004 |
| JP | 2010231247 A | 10/2010 |

OTHER PUBLICATIONS

First office action issued in Chinese Patent Application No. 201910413499.1 with search report.
First office action issued in CN108897169A (No. 13) above, citing Nos. 9-12 references & US20090310064 listed above.
Second office action issued in CN108897169A listed above, citing No. 14 reference listed above.

* cited by examiner

DISPLAY MODULE, DISPLAY DEVICE AND VIEWING-ANGLE SWITCHING METHOD

CROSS-REFERENCE TO RELATED APPLICATION

This application is a U.S. National Phase Entry of International Application No. PCT/CN2020/089948 filed on May 13, 2020, designating the United States of America and claiming priority to Chinese Patent Application No. 201910413499.1, filed on May 17, 2019. The present application claims priority to and the benefit of the above-identified applications and the above-identified applications are incorporated by reference herein in their entirety.

TECHNICAL FIELD

Embodiments of the present disclosure relate to a display module, a display device, and a viewing-angle switching method.

BACKGROUND

With development of society and abundance of material conditions, a wide variety of display devices such as mobile phones, computers, and televisions are becoming more and more closely associated with people's work and life. However, while the display devices provide people with many conveniences, privacy leakage is always unavoidable. In this regard, some anti-peep technologies have emerged in the industry.

Related anti-peep technologies include a glasses-type technology and a naked eye-type technology, of which the glasses-type technology uses an external auxiliary device such as auxiliary glasses to separate and protect confidential information, while the naked eye-type technology implements anti-peep display by controlling an angle of incident light; and the related naked eye-type technology may implement switching between anti-peep display and normal display at a same time.

SUMMARY

In first aspect, an embodiment of the present disclosure provides a display module, including: a backlight module, a display panel, a lower polarizer sheet, a viewing-angle switching element and a transparent cover plate; the viewing-angle switching element and the transparent cover plate are arranged between the display panel and the lower polarizer sheet, and the transparent cover plate is arranged on a side of the viewing-angle switching element that is close to the lower polarizer sheet; the backlight module is configured to supply light that meets a preset condition, the viewing-angle switching element is configured to switch viewing-angle modes of the display module; the viewing-angle modes include: a first viewing-angle mode and a second viewing-angle mode; and a viewing-angle range of the first viewing-angle mode is smaller than a viewing-angle range of the second viewing-angle mode.

For example, the preset condition is that a light emergent angle is less than or equal to 45 degrees.

For example, the viewing-angle switching element includes: a first transparent electrode, a second transparent electrode, and a viewing-angle switching layer; the viewing-angle switching layer is located between the first transparent electrode and the second transparent electrode; the first transparent electrode is located on a side of the viewing-angle switching layer that is close to the display panel; and the first transparent electrode and the second transparent electrode are configured to apply an electric field to the viewing-angle switching layer to change a state of the viewing-angle switching element.

For example, states of the viewing-angle switching element include: a transparent state and a scattering state. When the viewing-angle switching element is in the transparent state, the viewing-angle switching element is configured to cause light incident thereon to emerge along an incident direction, and the viewing-angle mode of the display module is the first viewing-angle mode; when the viewing-angle switching element is in the scattering state, the viewing-angle switching element is configured to scatter incident light, and the viewing-angle mode of the display module is the second viewing-angle mode.

For example, each of the first transparent electrode and the second transparent electrode is provided with a transparent insulating layer on a side away from the viewing-angle switching layer.

For example, the viewing-angle switching element further includes a switcher sealant; and the switcher sealant connects the first transparent electrode and the second transparent electrode.

For example, the display module further includes: a sealant, provided between the display panel and the transparent cover plate, and encapsulating the viewing-angle switching element. The first transparent electrode and the second transparent electrode are located on a side of the sealant that faces the viewing-angle switching layer.

For example, the display module further includes: a sealant, provided between the display panel and the transparent cover plate, and encapsulating the viewing-angle switching element. The first transparent electrode and the second transparent electrode overlap with the sealant in an arrangement direction of the display panel and the backlight module.

For example, the display module further includes: a flexible circuit board, a first conducting wire, a second conducting wire, a third conducting wire, and a fourth conducting wire; the first conducting wire and the second conducting wire are arranged on a side of the display panel that is close to the viewing-angle switching element, and are respectively connected with the flexible circuit board; the third conducting wire connects the first conducting wire and the first transparent electrode; and the fourth conducting wire connects the second conducting wire and the second transparent electrode.

For example, the display module further includes a conductive first adhesive; the first adhesive bonds the first conducting wire and the third conducting wire, and the first adhesive also bonds the second conducting wire and the fourth conducting wire.

For example, the display module further includes a second adhesive; the second adhesive bonds the viewing-angle switching element and the transparent cover plate.

For example, the display module further includes a sealant; the sealant is provided between the display panel and the transparent cover plate, and encapsulates the viewing-angle switching element.

For example, the display module further includes an optical adhesive and a sealant; the optical adhesive is located on a side of the viewing-angle switching element that is close to the transparent cover plate, and partially surrounds the viewing-angle switching element; the sealant is provided between the display panel and the transparent cover plate, and encapsulates the optical adhesive.

For example, the backlight module includes: a light source, a light guide plate and a reversing prism; wherein, the light source is located on a light incident side of the light guide plate, and the reversing prism is located on a side of the light guide plate that is close to the display panel.

For example, the backlight module includes: a light source configured to emit light that meets the preset condition; the light source includes: sub-millimeter light-emitting diodes arranged in an array.

For example, a distance between the lower polarizer sheet and the backlight module is 0.03 mm to 0.07 mm.

For example, the lower polarizer sheet is a multilayer reflective polarizer sheet.

For example, the lower polarizer sheet is located between the backlight module and the display panel.

In the second aspect, an embodiment of the present disclosure provides a display device, including: the display module provided by any one of the embodiments described above.

In the third aspect, an embodiment of the present disclosure provides a viewing-angle switching method, applied to the display module described above; the method including: controlling the viewing-angle switching element to switch the viewing-angle modes of the display module.

BRIEF DESCRIPTION OF THE DRAWINGS

In order to explain the technical scheme of the embodiments of the present disclosure more clearly, the drawings of the embodiments will be briefly introduced below. Obviously, the drawings in the following description only refer to some embodiments of the present disclosure, without limiting the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms used in the present disclosure should be of general meaning as understood by those ordinarily skilled in the art. In the disclosure, words such as "first", "second" and the like do not denote any order, quantity, or importance, but rather are used for distinguishing different components. Similarly, words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position of the described object is changed, the relative positional relationship may also be correspondingly changed.

Inventors of the present disclosure find out, through research, that a display module that can implement switching between anti-peep display and normal display in a related art has a relatively large thickness, thus failing to make a product light and thin.

Current mainstream anti-peep technologies mainly include three types below: a first technology is a combination of a display device and anti-peep glasses, and such a technology is a glasses-type anti-peep technology; a second technology is to provide a 3M anti-peep film and a polymer dispersed liquid crystal film in a backlight module; and a third technology is to provide a reversing prism and a polymer dispersed liquid crystal film in a backlight module. The second technology and the third technology are naked eye-type technologies.

In the first technology, the display device must be used with anti-peep glasses, which cannot implement free switching between anti-peep display and normal display, and is difficult to spread in daily applications. In the second technology, the anti-peep film and the polymer dispersed liquid crystal film are arranged in the backlight module of the display device, wherein the anti-peep film may reduce a viewing angle of the backlight module, while switching between anti-peep display and normal display may be implemented by controlling different states of the polymer dispersed liquid crystal film when energized/non-energized. Although the second technology may implement switching between anti-peep display and normal display, it has disadvantages below: (1) because the anti-peep film is relatively thick, and in order to avoid adsorption between the polymer dispersed liquid crystal film and a lower polarizer sheet, there should be a relatively large gap between the polymer dispersed liquid crystal film and a lower polarizer sheet, which further leads to a relatively large thickness of the display module; (2) because the anti-peep film has a great loss of light, and the lower polarizer sheet cannot adopt a multilayer reflective polarizer sheet, light transmittance is low, which further leads to high power consumption of the display device; and (3) because the polymer dispersed liquid crystal film is arranged in the backlight module, a flexible circuit board needs to be drawn from the backlight module to be connected with a printed circuit board, which further leads to difficulties in layout of the printed circuit board in the display device, and reduces production efficiency of a product. In the third technology, the reversing prism and the polymer dispersed liquid crystal film are arranged in the backlight module of the display device, wherein, the reversing prism may reduce a viewing angle of the backlight module, while switching between anti-peep display and normal display may be implemented by controlling different states of the polymer dispersed liquid crystal film when energized/non-energized; as compared with the second technology, although the third technology reduces the thickness of a display module to a certain extent, the thickness of the display module is too large to make a product light and thin; in addition, the lower polarizer sheet still fails to adopt a multilayer reflective polarizer sheet, which makes the display module consume a lot of power; and the polymer dispersed liquid crystal film is still provided in the backlight module, which reduces production efficiency of the product.

Embodiments of the present disclosure provide a display module, a display device, and a viewing-angle switching method. The embodiments of the present disclosure can reduce a thickness of the display module, to further make a product light and thin.

At least one embodiment of the present disclosure provides a display module; FIG. 1A to FIG. 1B, FIG. 4A to FIG. 4B, FIG. 6B, and FIG. 9A to FIG. 10B are structural schematic diagrams of the display module provided by the embodiment of the present disclosure; and as shown in these diagrams, the display module provided by at least one embodiment of the present disclosure includes a backlight module 10, a display panel 20 and a lower polarizer sheet 30, the lower polarizer sheet 30 being located between the backlight module 10 and the display panel 20 in an arrangement direction of the backlight module 10 and the display panel 20; the display module further includes a viewing-angle switching element 40 and a transparent cover plate 50; the viewing-angle switching element 40 and the transparent cover plate 50 being arranged between the display panel 20 and the lower polarizer sheet 30 in the arrangement direction of the backlight module 10 and the display panel 20; the transparent cover plate 50 is arranged on a side of the viewing-angle switching element 40 that is close to the lower polarizer sheet 30 (i.e., the transparent cover plate 50 being located between the viewing-angle switching element 40 and the lower polarizer sheet 30 in the arrangement direction of the backlight module 10 and the display panel 20).

In the embodiment of the present disclosure, the backlight module 10 is configured to supply light that meets a preset condition, the viewing-angle switching element 40 is configured to switch a viewing-angle mode of the display module; the viewing-angle mode includes: a first viewing-angle mode and a second viewing-angle mode; and a viewing-angle range of the first viewing-angle mode is smaller than a viewing-angle range of the second viewing-angle mode. The first viewing-angle mode is used for implementing anti-peep display, and the second viewing-angle mode is used for implementing normal display.

For example, the display module provided by the embodiment of the present disclosure further includes an upper polarizer 60; the display panel 20 is located between the upper polarizer 60 and the lower polarizer sheet 30; and optical axes of the upper polarizer 60 and the lower polarizer sheet 30 are perpendicular to each other.

For example, the display panel 20 may be a liquid crystal display panel or other non-active light-emitting display panel. For example, as shown in FIGS. 1B, 4B, 6B, 9B, 9C and 10B, the display panel 20 includes an array substrate 201 and an opposed substrate 202 arranged opposite to each other; the array substrate 202 includes a plurality of sub-pixels arranged in a matrix. For example, when the display panel 20 is a liquid crystal display panel, the display panel 20 includes: an array substrate and an opposed substrate (e.g., the opposed substrate is a color filter substrate including a color filter) arranged opposite to each other, as well as a liquid crystal layer provided between the array substrate and the opposed substrate (not shown); and the array substrate is arranged on a side of the liquid crystal layer that is close to the backlight module 10 (i.e., the array substrate is located between the liquid crystal layer and the backlight module).

For example, the backlight module 10 is configured to supply the display panel 20 with light that meets a preset condition. For example, the preset condition is that a light emergent angle (i.e., an angle between emergent light and a normal) is less than or equal to 45 degrees; for example, the preset condition is that the light emergent angle is 30 degrees, which will not be limited in the embodiment of the present disclosure.

In the embodiment of the present disclosure, the transparent cover plate 50 is configured to separate the viewing-angle switching element 40 from the lower polarizer sheet 30, which can avoid adsorption between the viewing-angle switching element 40 and the lower polarizer sheet 30. Because the transparent cover plate 50 is made of a transparent material, the transparent cover plate does not affect display of the display module.

For example, the lower polarizer sheet 30 is in direct contact with the transparent cover plate 50. By providing the transparent cover plate 50, it is convenient to adhere to the lower polarizer sheet 30 (an upper surface of the lower polarizer sheet 30 is an adhesive surface, and the adhesive surface is adhered to the transparent cover plate 50), thereby reducing difficulties in a fabrication process.

For example, the transparent cover plate 50 may be made of a rigid material or a flexible material. For example, the lower polarizer sheet 30 is rigid, and the transparent cover plate 50 is also rigid; such arrangement facilitates adhesion therebetween. For example, the rigid material may include, but not limited to glass; the flexible substrate may be made of a material including, but not limited to one or more of polyethylene glycol terephthalate, bis-β-hydroxyethyl terepliathalate, polyether ether ketone, polystyrene, polycarbonate, polyarylate, polyarylester, polyimide, polyvinyl chloride, polyethylene, and textile fiber, as long as the material is a transparent material, which will not be limited in the embodiment of the present disclosure.

The display module provided by the embodiment of the present disclosure includes the backlight module, the display panel and the lower polarizer sheet, and further includes the viewing-angle switching element and the transparent cover plate; the lower polarizer sheet is located between the backlight module and the display panel, the viewing-angle switching element and the transparent cover plate are arranged between the display panel and the lower polarizer sheet, the transparent cover plate is arranged on the side of the viewing-angle switching element that is close to the lower polarizer sheet; the backlight module is configured to supply light that meets the preset condition, the viewing-angle switching element is configured to switch the viewing-angle modes of the display module; the viewing-angle modes includes the first viewing-angle mode and the second viewing-angle mode, and the viewing-angle range of the first viewing-angle mode is smaller than the viewing-angle range of the second viewing-angle mode. The technical solution provided by the present disclosure, by arranging the viewing-angle switching element configured to switch the viewing angle of the display module between the display panel and the transparent cover plate, avoids a large gap between the viewing-angle switching element and the lower polarizer sheet, and can reduce the thickness of the display module, to further make the product light and thin.

For example, since the transparent cover plate 50 is provided between the viewing-angle switching element 40 and the lower polarizer sheet 30, there is no adsorption between the viewing-angle switching element 40 and the lower polarizer sheet 30. For example, the lower polarizer sheet according to the embodiment of the present disclosure can be a multilayer reflective polarizer sheet; and the multilayer reflective polarizer sheet has higher light transmittance and can reduce power consumption of the display module, which achieves a low power consumption of the product.

For example, because the viewing-angle switching element 40 is provided between the display panel 20 and the transparent cover plate 50, but not in the backlight module 10, a distance L between the lower polarizer sheet 30 and the backlight module 10 is 0.03 mm to 0.07 mm, which further reduces the thickness of the display module and makes the product light and thin. It should be noted that, the distance L is a distance from the film of the backlight module 10, closest to the lower polarizer sheet 30, to the lower polarizer sheet 30. For example, with respect to the backlight module shown in FIG. 2A and FIG. 2B, the distance L is a distance from the reversing prism 13, which is the film of the backlight module 10 closest to the lower polarizer sheet 30, to the lower polarizer sheet 30; with respect to the backlight module 10 as shown in FIG. 2C, the distance L is a distance from the diffuser sheet 15 which is the film of the backlight module 10 closest to the lower polarizer sheet 30, to the lower polarizer sheet 30.

The backlight module provided by the embodiment of the present disclosure is configured to supply light that meets the preset condition, and the embodiment of the present disclosure provides two implementation modes of the backlight module.

Figure 1A:
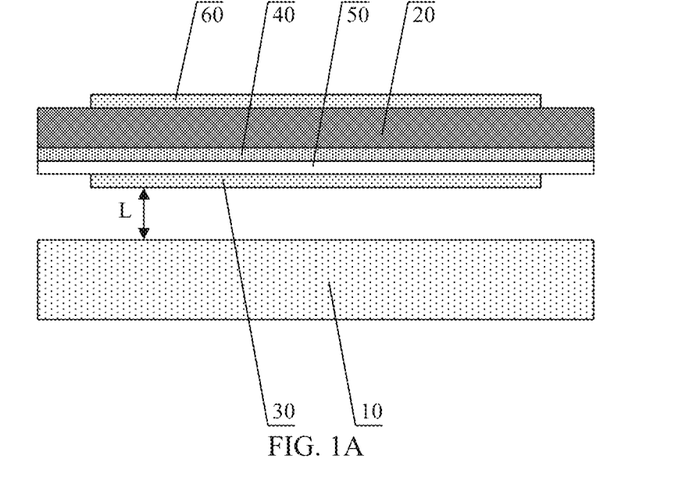
FIG. 1A is a structural schematic diagram I of a display module provided by an embodiment of the present disclosure.
Figure 1B:
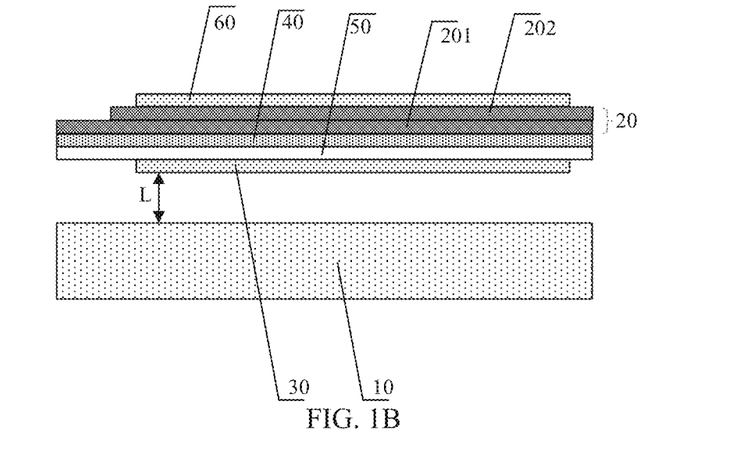
FIG. 1B is a structural schematic diagram II of a display module provided by the embodiment of the present disclosure.
Figure 2A:
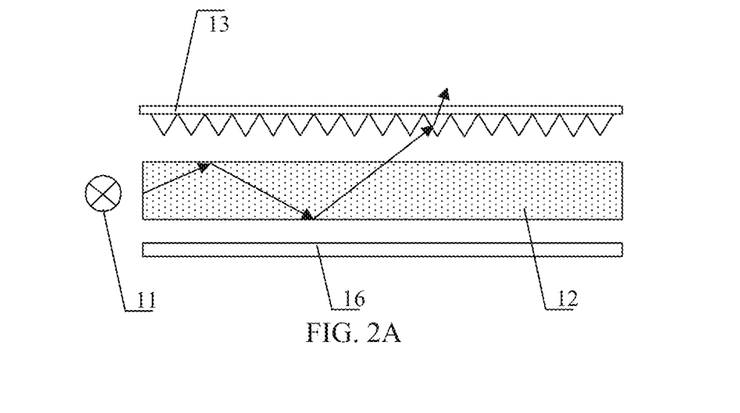
FIG. 2A is a structural schematic diagram I of a backlight module provided by the embodiment of the present disclosure.
Figure 2B:
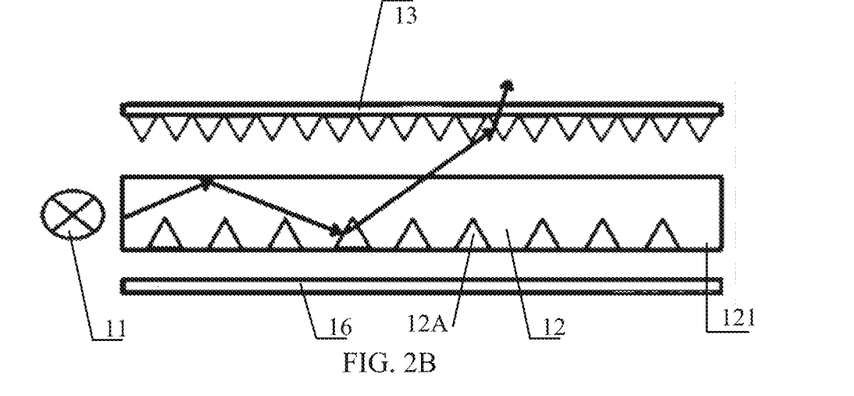
FIG. 2B schematically shows a light guide plate with an uneven structure in the backlight module provided in FIG. 2A.
Figure 2C:
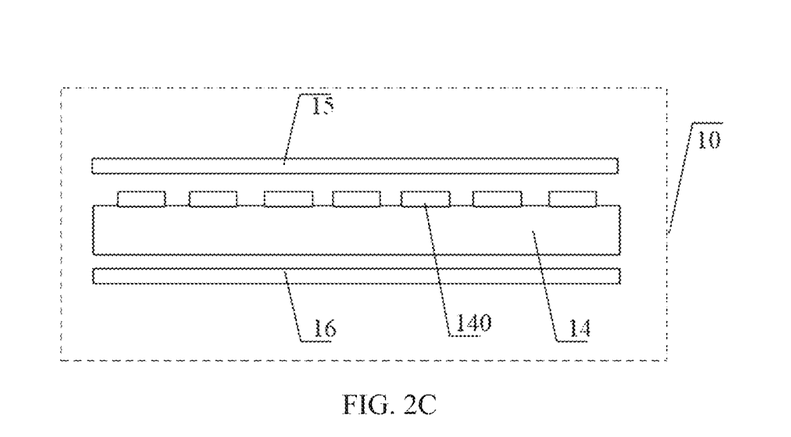
FIG. 2C is a structural schematic diagram II of the backlight module provided by the embodiment of the present disclosure.
Figure 2D:
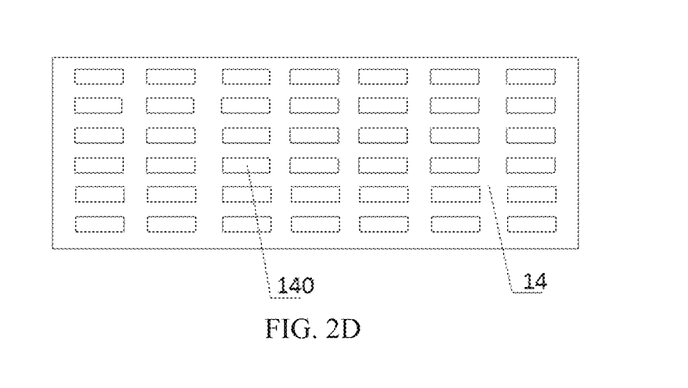
FIG. 2D is a schematic top view of sub-millimeter light-emitting diodes arranged in an array in the backlight module provided by the embodiment of the present disclosure.

As one implementation mode, FIG. 2A and FIG. 2B are structural schematic diagrams of the backlight module provided by the embodiment of the present disclosure; as shown in FIG. 2A and FIG. 2B, the backlight module 10 provided by at least one embodiment of the present disclosure includes a light source 11, a light guide plate 12 and a reversing prism 13; the light source 11 is located on a light incident side of the light guide plate 12, and the reversing prism 13 is located on a side of the light guide plate 12 that is close to the display panel (i.e., the reversing prism 13 is located between the light guide plate 12 and the display panel 20). For example, the reversing prism 13 includes a base substrate and a plurality of prism microstructures located on a side of the base substrate that faces the light guide plate 12; and each prism microstructure includes two inclined surfaces that form a non-zero included angle. For example, the reversing prism 13 is adjacent to the light guide plate 12, that is to say, light emergent from the light guide plate 12 is directly incident into the reversing prism 13 after passing through a gap between the light guide plate 12 and the reversing prism 13 (e.g., the gap is an air layer).

For example, as shown in FIG. 2B, a surface 121 of the light guide plate 12 that faces away from the reversing prism 13 (a lower surface in the diagram) has an uneven structure 12A; and the uneven structure 12A has two intersecting inclined surfaces. By making the light guide plate 12 have the uneven structure 12A and by adopting the reversing prism, the backlight module may emit light that meets the preset condition, that is, a narrow viewing-angle backlight module may be implemented.

For example, the light source 11 may be a light source of a side-lit type (i.e., light emitted by the light source 11 enters the light guide plate 12 from a side surface of the light guide plate 12), or may be a light source of a direct-lit type (i.e., light emitted by the light source 11 enters the light guide plate 12 from a lower surface of the light guide plate 12); and it should be noted that FIG. 2A is described by taking an example that the light source 11 is a light source of a side-lit type.

As the other implementation mode, FIG. 2C is a structural schematic diagram II of the backlight module provided by the embodiment of the present disclosure; as shown in FIG. 2C, the backlight module 10 provided by at least another embodiment of the present disclosure includes a light source 14 of a direct-lit type configured to emit light that meets the preset condition; and the light source 14 includes sub-millimeter light-emitting diodes 140 arranged in an array.

For example, as shown in FIG. 2C, the backlight module provided by some embodiments of the present disclosure further includes a diffuser sheet 15 configured to uniformly diffuse light; the diffuser sheet 15 is located on a side of the backlight module 10 that is close to the display panel (e.g., the diffuser sheet 15 is located between the sub-millimeter light-emitting diodes 140 and the display panel). Light emitted by the sub-millimeter light-emitting diodes 140 after passing through the diffuser sheet 15 meets the above-described preset condition.

For example, in order to improve a light utilization rate, as shown in FIG. 2A to FIG. 2C, the backlight module further includes a reflective sheet 16; and the reflective sheet 16 is located on a side of the backlight module 10 that is away from the display panel.

In the display module provided by the embodiments of the present disclosure, because the viewing-angle switching element 40 configured to switch the viewing-angle mode of the display module is provided between the backlight module 10 and the display panel 20, the backlight module 10 neither includes the polymer dispersed liquid crystal film mentioned in the second technology and the third technology as described above, nor includes the anti-peep film mentioned in the above-described second technology. Therefore, the backlight module in the display module provided by the embodiment of the present disclosure has a smaller thickness.

Figure 3A:
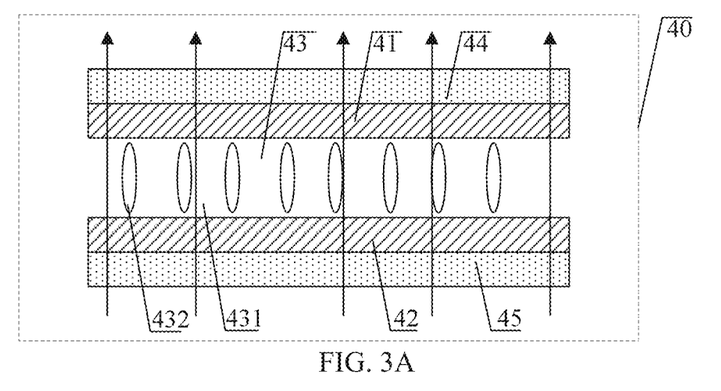
FIG. 3A is a state diagram I of a viewing-angle switching element provided by the embodiment of the present disclosure.
Figure 3B:
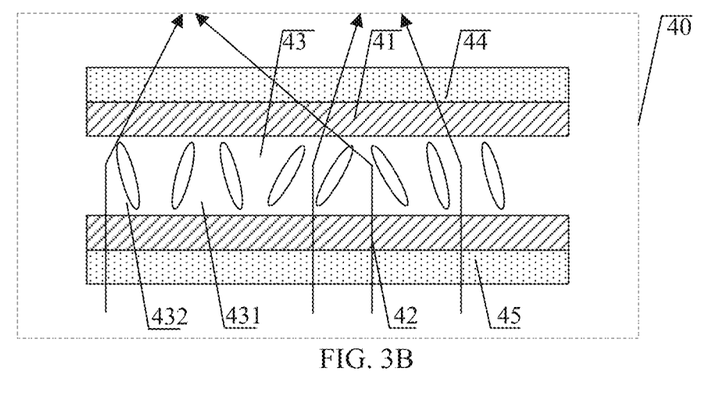
FIG. 3B is a state diagram II of the viewing-angle switching element provided by the embodiment of the present disclosure.

For example, FIG. 3A is a state diagram I of the viewing-angle switching element provided by the embodiment of the present disclosure; FIG. 3B is a state diagram II of the viewing-angle switching element provided by the embodiment of the present disclosure; as shown in FIG. 3A and FIG. 3B, the viewing-angle switching element 40 in the display module provided by the embodiment of the present disclosure includes: a first transparent electrode 41, a second transparent electrode 42 and a viewing-angle switching layer 43. Both the first transparent electrode 41 and the second transparent electrode 42 are continuous planar structures.

For example, the viewing-angle switching layer 43 is located between the first transparent electrode 41 and the second transparent electrode 42; the first transparent electrode 41 is located on a side of the viewing-angle switching layer 43 that is close to the display panel 20 (i.e., the first transparent electrode 41 is located between the viewing-angle switching layer 43 and the display panel 20); and the first transparent electrode 41 and the second transparent electrode 42 are configured to apply an electric field to the viewing-angle switching layer 43, so as to change a state of the viewing-angle switching element 40.

For example, the state of the viewing-angle switching element 40 include a transparent state and a scattering state. When the viewing-angle switching element 40 is in the transparent state, the viewing-angle switching element 40 is configured to cause light incident thereon to emerge along an incident direction; and the viewing-angle mode of the display module is the first viewing-angle mode; when the viewing-angle switching element 40 is in the scattering state, the viewing-angle switching element 40 is configured to scatter incident light; and the viewing-angle mode of the display module is the second viewing-angle mode. FIG. 3A is described by taking that the viewing-angle switching element is in the transparent state as an example; and FIG. 3B is described by taking that the viewing-angle switching element is in the scattering state as an example.

For example, the first transparent electrode 41 and the second transparent electrode 42 are made of a transparent conductive material; for example, the transparent conductive material may be indium tin oxide or zinc tin oxide, which will not be limited in the embodiment of the present disclosure.

For example, the viewing-angle switching layer 43 can be made of a polymer dispersed liquid crystal or a multi-stable liquid crystal, or can be made of other material that may change between the transparent state and the scattering state, or may be any other implementation mode that may switch between the transparent state and the scattering state well-known to those skilled in the art.

For example, when the viewing-angle switching layer 43 is made of a polymer dispersed liquid crystal, the viewing-angle switching layer 43 includes: a polymer matrix 431 and a liquid crystal 432 mixed in the polymer matrix 431.

For example, a mass mixing ratio of the polymer matrix and the liquid crystal is 1:0.8 to 1.2.

For example, a material of the polymer matrix may be one or more components of hydroxypropyl acrylate, hydroxypropyl methacrylate, lauryl acrylate, lauryl methacrylate, isobornyl acrylate, isobornyl methacrylate, hexanediol diacrylate, ethyl phenoxy acrylate, ethyl phenoxy methacrylate, trimethylcyclohexyl acrylate, benzyl methacrylate, hexyl acrylate, hexyl methacrylate, polyethylene glycol diacrylate, and ethoxylated bisphenol A dimethacrylate.

It should be noted that, liquid crystal is an anisotropic substance; when light propagates in the liquid crystal, birefringence occurs; after passing through a birefringent substance, natural light will be decomposed into two beams of fully polarized light, one beam is ordinary light that obeys laws of refraction, and the other beam is extraordinary light that does not obey the laws of refraction. Therefore, the liquid crystal has a refractive index no of ordinary light (hereinafter referred to as an ordinary refractive index) and a refractive index ne of extraordinary light.

In the embodiment of the present disclosure, a refractive index of the polymer matrix is inconsistent with an effective refractive index of the liquid crystal; and the refractive index of the polymer matrix is consistent with the ordinary refractive index of the liquid crystal. It should be noted that the effective refractive index of the liquid crystal, which is inconsistent with the refractive index of the polymer matrix, refers to the statistical refractive index of the overall liquid crystal when the liquid crystal is freely arranged without an action of an electric field. The ordinary refractive index of the liquid crystal refers to the refractive index of ordinary light of the liquid crystal, which can be understood as that when an arrangement direction of the liquid crystal is consistent with the electric field under the action of the electric field, the ordinary refractive index of the arrangement direction of the liquid crystal is consistent with the refractive index of the polymer matrix. For example, that the refractive index of the polymer matrix is inconsistent with the effective refractive index of the liquid crystal refers to that a difference between the refractive index of the polymer matrix and the effective refractive index of the liquid crystal is greater than 0.01; that the refractive index of the polymer matrix is consistent with the ordinary refractive index of the liquid crystal refers to that a difference between the refractive index of the polymer matrix and the ordinary refractive index of the liquid crystal is less than or equal to 0.01.

For example, the refractive index of the polymer matrix is equal to the ordinary refractive index of the liquid crystal.

For example, the liquid crystal may be a smectic liquid crystal (i.e., a liquid crystal whose molecules are arranged in an orderly degree similar to that of a crystal); the smectic liquid crystal has better stability and can maintain the stable transparent state and scattering state of the viewing-angle switching element.

For example, when fabricating the viewing-angle switching layer, the smectic liquid crystal and the material for fabricating the polymer matrix may be mixed uniformly, then squeezed between two layers of transparent electrodes to form a thin film, and then the thin film is irradiated with ultraviolet light at a temperature of 25 degrees Celsius, so as to obtain the viewing-angle switching layer located between the two layers of transparent electrodes. In the obtained viewing-angle switching layer, the liquid crystal presents in the polymer matrix in a state of micron-scale droplets.

In the embodiment of the present disclosure, for example, a thickness of the viewing-angle switching layer 43 is 5 μm to 20 μm.

In at least one embodiment of the present disclosure, when the first transparent electrode 41 and the second transparent electrode 42 are respectively applied with different electrical signals to generate an electric field therebetween, the liquid crystal in the polymer matrix is regularly arranged along a direction of the electric field; the ordinary refractive index of the liquid crystal is consistent with the refractive index of the polymer matrix, so that the viewing-angle switching element is in the transparent state, light may freely penetrate the viewing-angle switching element; in this case, light emergent from the viewing-angle switching element is emergent in a direction of the incident light, and the viewing-angle mode of the display module is the first viewing-angle mode to implement anti-peep display; when the electrical signal applied to the first transparent electrode 41 and the second transparent electrode 42 disappears, due to an anchoring action between the liquid crystal molecules and the matrix interface, the liquid crystal molecules are in an irregularly dispersed state, the effective refractive index of the liquid crystal is inconsistent with the refractive index of the polymer matrix; in this case, the viewing-angle switching element is in the scattering state, has a divergent effect on light, and can diffuse a light emitting angle, and the viewing-angle mode of the display module is the second viewing-angle mode to implement normal display. The display module provided by the embodiment of the present disclosure, by controlling the electrical signals applied to the two transparent electrodes of the viewing-angle switching element, switches the viewing-angle modes of the display module, to further implement switching between anti-peep display and normal display.

For example, in order to protect the viewing-angle switching element and further improve service life of the display module, as shown in FIG. 3A and FIG. 3B, a transparent insulating layer is provided on a side of each transparent electrode away from the viewing-angle switching layer, in the display module provided by the embodiment of the present disclosure has.

For example, the above-described transparent insulating layers in the display module includes a first transparent insulating layer 44 and a second transparent insulating layer 45; the first transparent insulating layer 44 is provided on a side of the first transparent electrode 41 that is away from the viewing-angle switching layer 43 (i.e., the first transparent insulating layer 44 is located on a side of the first transparent electrode 41 that faces the display panel 40), and the second transparent insulating layer 45 is provided on a side of the second transparent electrode 42 that is away from the viewing-angle switching layer 43.

For example, the first transparent insulating layer 44 and the second transparent insulating layer 45 may be made of silicon oxide, silicon nitride, or a composite of silicon oxide and silicon nitride, as long as it is a transparent insulating material, which will not be limited in the embodiment of the present disclosure.

Figure 4A:
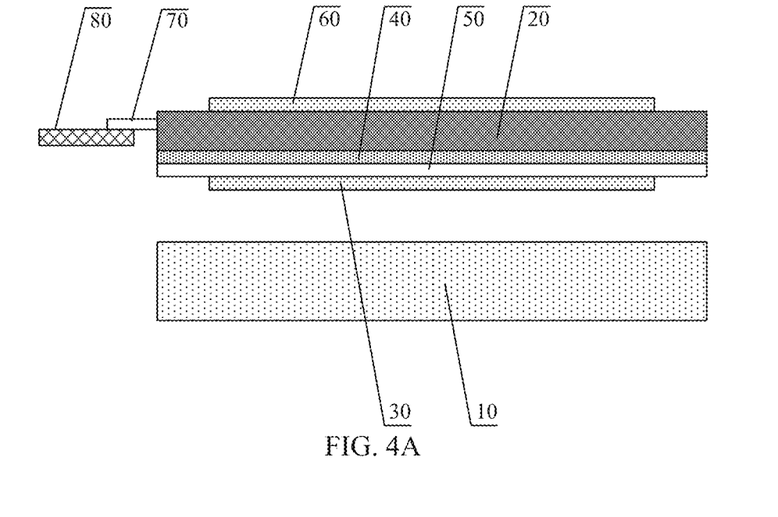
FIG. 4A is a cross-sectional view I of the display module provided by the embodiment of the present disclosure.
Figure 4B:
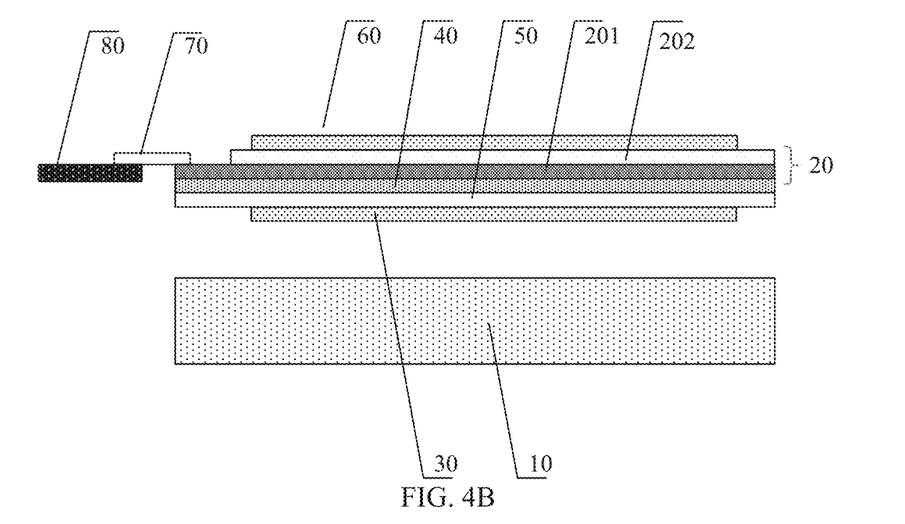
FIG. 4B is a cross-sectional view II of the display module provided by the embodiment of the present disclosure.
Figure 5:
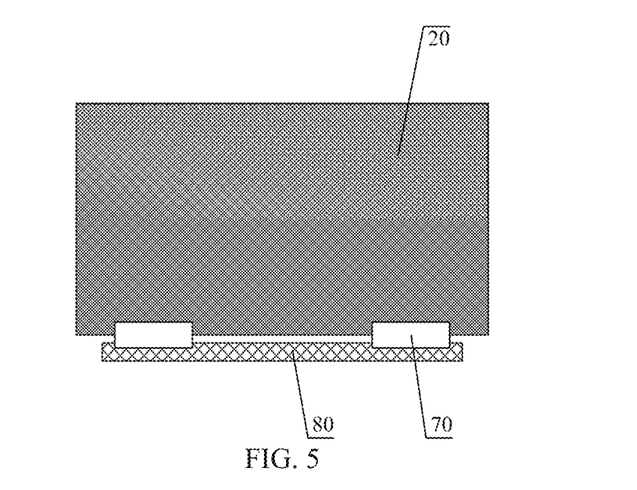
FIG. 5 is a top view corresponding to FIG. 4A.
Figure 6A:
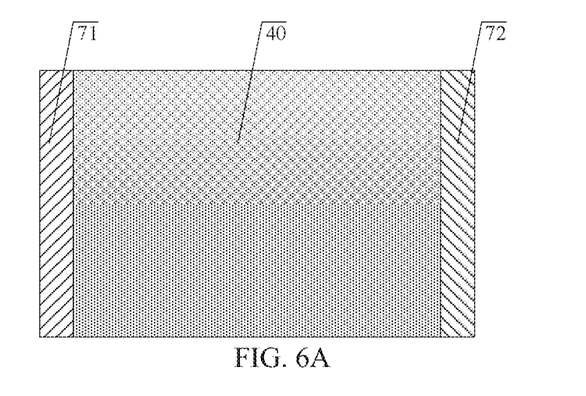
FIG. 6A is a top view of the display module provided by the embodiment of the present disclosure.
Figure 6B:
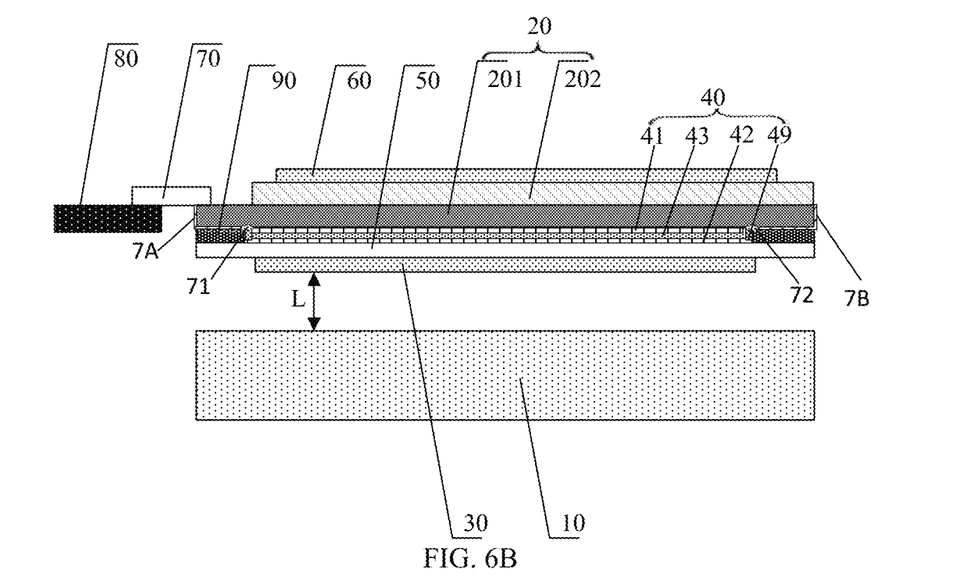
FIG. 6B is a structural schematic diagram III of the display module provided by the embodiment of the present disclosure.
Figure 7:
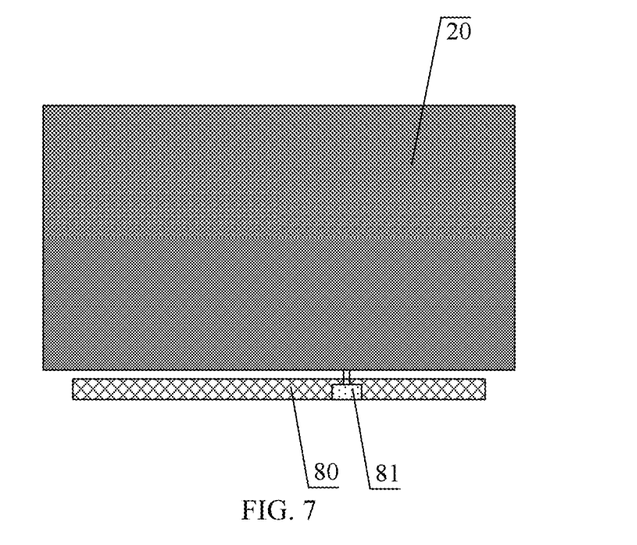
FIG. 7 is a bottom view of the display module provided by the embodiment of the present disclosure.

For example, FIG. 4A and FIG. 4B are cross-sectional views of the display module provided by the embodiment of the present disclosure; FIG. 5 is a top view corresponding to FIG. 4A; FIG. 6A is a top view of the display module provided by the embodiment of the present disclosure; FIG. 6B is a structural schematic diagram of the display module provided by the present disclosure; FIG. 7 is a bottom view of the display module provided by the embodiment of the present disclosure; as shown in FIG. 4A to FIG. 7, the display module provided by at least one embodiment of the present disclosure further includes: a flexible circuit board 70, a first conducting wire 7A, a second conducting wire 7B, a third conducting wire 71 and a fourth conducting wire 72. As shown in FIG. 6B, the first conducting wire 7A and the second conducting wire 7B are arranged on a side of the display panel 20 that is close to the viewing-angle switching element 40; for example, the first conducting wire 7A and the second conducting wire 7B are in direct contact with the array substrate 201 of the display panel 20. For example, the first conducting wire 7A and the second conducting wire 7B each have a portion located between the display panel 20 and the viewing-angle switching element 40, and also include a portion located on a side surface of the array substrate 201. In addition, the first conducting wire 7A and the second conducting wire 7B are each connected with the flexible circuit board 70. It should be noted that, the second conducting wire 7B is electrically connected with wiring in the display panel 20, and further electrically connected with the flexible circuit board 70. The third conducting wire 71 is connected with the first conducting wire 7A and the first transparent electrode 41; and the fourth conducting wire 72 is connected with the second conducting wire 7B and the second transparent electrode 42. That is, the first transparent electrode 41 is electrically connected with the first conducting wire 7A through the third conducting wire 71, and is further electrically connected with the flexible circuit board 70; and the second transparent electrode 42 is electrically connected with the second conducting wire 7B through the fourth conducting wire 72, and is further electrically connected with the flexible circuit board 70.

The display module provided by the embodiment of the present disclosure further includes a printed circuit board 80; the flexible circuit board 70 is connected with the printed circuit board 80; and the flexible circuit board 70 is also connected with the array substrate 201 (i.e., the flexible circuit board 70 is drawn from the array substrate 201), so that the array substrate 201 is electrically connected with the printed circuit board 80 through the flexible circuit board 70.

For example, the first conducting wire 7A and the second conducting wire 7B are arranged on a side of the array substrate 201 that is close to the viewing-angle switching element 40. It should be noted that, the flexible circuit board 70 in FIG. 4 and FIG. 5 is configured to connect the display panel and the printed circuit board 80.

In at least one embodiment of the present disclosure, the third conducting wire 71 and the fourth conducting wire 72 may be arranged around the viewing-angle switching element 40; for example, as shown in FIG. 6A, the third conducting wire 71 extends along one side edge of the viewing-angle switching element 40, and the fourth conducting wire 72 extends along the other side edge of the viewing-angle switching element 40; for example, the other side edge is opposite to the one side edge. Or, through holes may also be opened in the viewing-angle switching element 40; and the third conducting wire 71 and the fourth conducting wire 72 are provided in the through holes, which will not be limited in the embodiment of the present disclosure; it should be noted that, in FIG. 6, it is described by taking that the third conducting wire 71 and the fourth conducting wire 72 are arranged around a portion of the viewing-angle switching element 40 as an example. Preferably, in order to increase the service life of the display module, the third conducting wire 71 and the fourth conducting wire 72 may be arranged to encircle the viewing-angle switching element.

For example, the third conducting wire 71 and the fourth conducting wire 72 may be made of copper.

In at least one embodiment of the present disclosure, as shown in FIG. 7, the printed circuit board 80 includes a light bar connector 81 configured to be connected with the light source 11/14 in the backlight module, so as to supply a voltage to the light source 11/14. As compared with the anti-peep technology provided in the related art, the printed circuit board 80 in the display module provided by the embodiment of the present disclosure is not provided with any other port connected with the backlight module except the light bar connector 81.

The viewing-angle switching element according to the embodiment of the present disclosure connects the flexible circuit board 70 and the printed circuit board 80 through conducting wire provided on the display panel 20, thereby omitting two flexible circuit boards being drawn from the backlight module and configured to couple the polymer liquid crystal film included in the backlight module to the printed circuit board, which are provided when anti-peep display is implemented in the related art, and omitting two drive connectors used for the polymer liquid crystal film. Therefore, in the embodiment of the present disclosure, the printed circuit board 80 connected with the array substrate 201 through the flexible circuit board 70 may be adopted for circuit layout, which improves production efficiency of the product.

Figure 8:
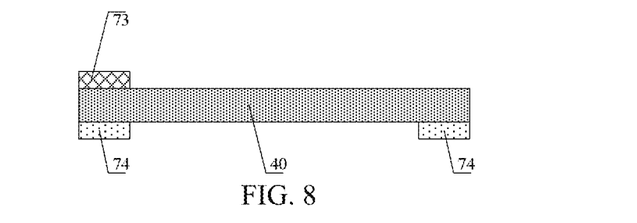
FIG. 8 is a partial schematic diagram of the display module provided by the embodiment of the present disclosure.

For example, FIG. 8 is a partial schematic diagram of the display module provided by the embodiment of the present disclosure; as shown in FIG. 8, the display module provided by the embodiment of the present disclosure further includes a conductive first adhesive 73; the first adhesive 73 is used to bond the first conducting wire 7A and the third conducting wire 71 (referring to FIG. 6B), and is also used to bond the second conducting wire 7B and the fourth conducting wire 72 (referring to FIG. 6B).

The embodiment of the present disclosure can improve a yield rate of the display module by providing the first adhesive 73, and avoid a low yield rate of the display module caused by poor contact between the first conducting wire the third conducting wire, or poor contact between the second conducting wire and the fourth conducting wire.

For example, as shown in FIG. 8, the display module provided by the embodiment of the present disclosure further includes a second adhesive 74; and the second adhesive 74 is used to bond the viewing-angle switching element 40 and the transparent cover plate.

In the embodiment of the present disclosure, the second adhesive 74 may play a role in fixing the viewing-angle switching element 40 and the transparent cover plate 50, thereby improving the yield rate of the display module.

For example, in order to prevent water and oxygen from entering the viewing-angle switching element to cause failure of the viewing-angle switching element, and in order to improve the yield rate of the display module, the embodiment of the present disclosure provides a variety of modes of encapsulating the viewing-angle switching element. FIG. 9A to FIG. 10B are structural schematic diagrams of the display module provided by the embodiment of the present disclosure; as shown in FIG. 6B and FIG. 9A to FIG. 10B, the display module provided by the embodiment of the present disclosure further includes a sealant 90. The sealant 90 is provided between the display panel 20 and the transparent cover plate 50, to encapsulate the viewing-angle switching element 40. For example, as shown in FIG. 6B, FIG. 9B to FIG. 9C and FIG. 10B, the viewing-angle switching element 40 further includes a switcher sealant 49; the switcher sealant 49 connects the first transparent electrode 41 and the second transparent electrode 42; and the viewing-angle switching layer 43 is located in a region enclosed by the switcher sealant 49, the first transparent electrode 41 and the second transparent electrode 42.

For example, as shown in FIG. 6B, FIG. 9A to FIG. 9C, FIG. 10A and FIG. 10B, the sealant 90 connects the display panel 20 and the transparent cover plate 50 to form a cavity between the display panel 20 and the transparent cover plate 50; and the viewing-angle switching element 40 is located in the cavity. For example, the switcher sealant 49 and the viewing-angle switching layer 43 are both located in the cavity. For example, each of the first transparent electrode 41 and the second transparent electrode 42 is only partially or entirely located on a side of the sealant 90 that faces the viewing-angle switching layer 43.

Figure 9A:
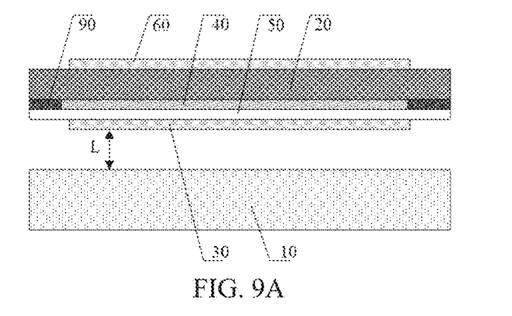
FIG. 9A is a structural schematic diagram IV of the display module provided by the embodiment of the present disclosure.
Figure 9B:
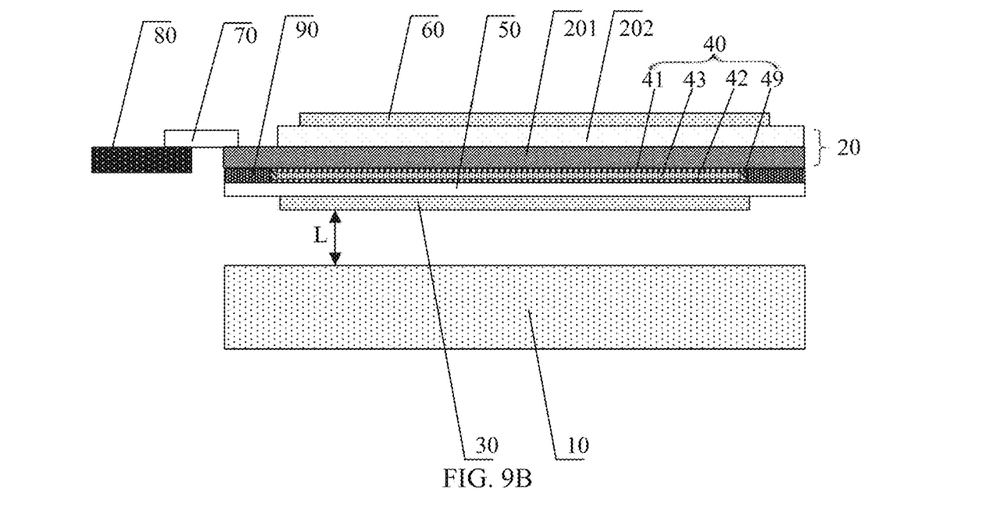
FIG. 9B is a structural schematic diagram V of the display module provided by the embodiment of the present disclosure.

For example, as shown in FIG. 9A and FIG. 9B, the viewing-angle switching element 40 and the transparent cover plate 50 are vacuum bonded (i.e., bonded by vacuum suction).

Figure 10A:
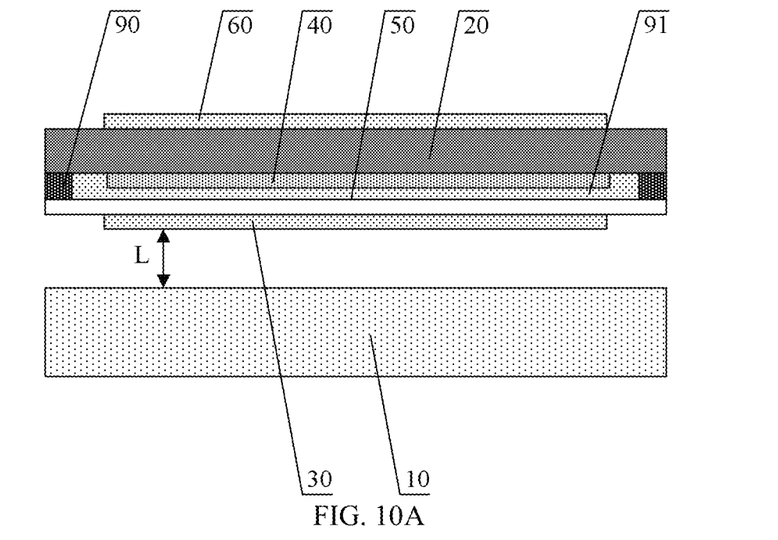
FIG. 10A is a structural schematic diagram VII of the display module provided by the embodiment of the present disclosure.
Figure 10B:
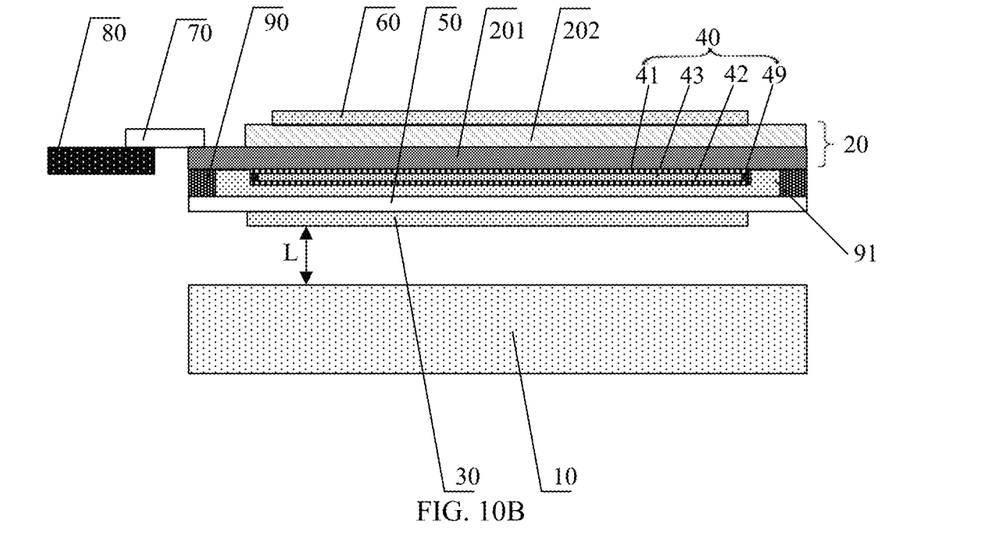
FIG. 10B is a structural schematic diagram VIII of the display module provided by the embodiment of the present disclosure.

For example, as shown in FIG. 6B, FIG. 10A and FIG. 10B, the display module provided by the embodiment of the present disclosure further includes an optical adhesive 91. The optical adhesive 91 is located in the cavity between the display panel 20 and the transparent cover plate 50, is located on a side of the viewing-angle switching element 40 that is close to the transparent cover plate 50 (i.e., the viewing-angle switching element 40 is located on a side of the optical adhesive 91 that is away from the transparent cover plate 50), and is used to partially surround the viewing-angle switching element 40; the sealant 90 is provided between the display panel 20 and the transparent cover plate 50, to encapsulate the optical adhesive 91. The optical adhesive 91 is obtained by curing a liquid optical adhesive. In this implementation mode, for example, the upper surface of the viewing-angle switching element 40 is in contact with the display panel 20, and the side surface and the lower surface of the viewing-angle switching element 40 are surrounded by the optical adhesive 91; and the viewing-angle switching element 40 is free of substances such as water and oxygen, and is vacuum bonded with the display panel 20 and the transparent cover plate 50.

In some embodiments, the viewing-angle switching element 40 may be fabricated separately and then placed between the display panel 20 and the transparent cover plate 50. For example, in this case, the viewing-angle switching element 40 is bonded to the transparent cover plate 50 by vacuum suction or bonded to the transparent cover plate 50 by the optical adhesive 91. In this case, for example, the first transparent electrode 41 of the viewing-angle switching element 40 is electrically connected with the first conducting wire 7A through a portion of the above-described conductive first adhesive 73; and the second transparent electrode 42 is electrically connected with the second conducting wire 7B through another portion of the above-described conductive first adhesive 73. For example, as shown in FIG. 6B, the switcher sealant 49 located at a junction of the first conducting wire 7A and the third conducting wire 71 is electrically insulated; and the switcher sealant 49 located at a junction of the second conducting wire 7B and the fourth conducting wire 72 is conductive (e.g., conductive particles are provided in the switcher sealant 49 to implement a conductive function); and the first transparent electrode 41 is spaced apart from the conductive switcher sealant 49, so that the first transparent electrode 41 and the second transparent electrode 42 are electrically insulated from each other.

Figure 9C:
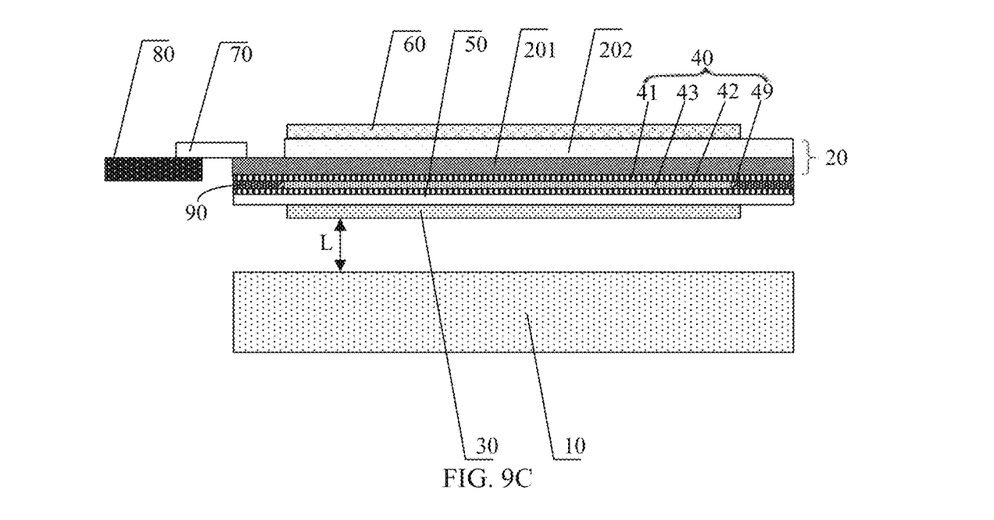
FIG. 9C is a structural schematic diagram VI of the display module provided by the embodiment of the present disclosure.

In other embodiments, the viewing-angle switching element 40 may be formed in following mode: forming the first transparent electrode 41 on a side of the array substrate 201 that faces the backlight module 10; forming the second transparent electrode 42 on a side of the transparent cover plate 50 that faces the display panel 20; thereafter, cell-assembling the array substrate 201 with the first transparent electrode 41 formed thereon and the transparent cover plate 50 with the second transparent electrode 42 formed thereon; and placing the viewing-angle switching layer 43 between the array substrate 201 with the first transparent electrode 41 formed thereon and the transparent cover plate 50 with the second transparent electrode 42 formed thereon. In this case, for example, as shown in FIG. 9C, the first transparent electrode 41 and the second transparent electrode 42 overlap with the sealant 90 in the arrangement direction of the display panel 20 and the backlight module 10. In addition, in this case, there is no need to use the first adhesive 71 and the second adhesive 73 as described above, thereby further reducing the thickness and simplifying the structure of the display module.

Based on the inventive concept of any one of the above-described embodiments, at least one embodiment of the present disclosure further provides a viewing-angle switching method; the viewing-angle switching method is applied to the display module; and the viewing-angle switching method provided by the embodiment of the present disclosure includes: controlling the viewing-angle switching element to switch the viewing-angle mode of the display module. Controlling the viewing-angle switching element includes: controlling a state of the viewing-angle switching element by controlling an electric field applied to the first transparent electrode and the second transparent electrode; when the viewing-angle switching element is in the transparent state, the viewing-angle mode of the display module is the first viewing-angle mode; and when the viewing-angle switching element is in the scattering state, the viewing-angle mode of the display module is the second viewing-angle mode.

The display module is the display module provided by any one of the above-described embodiments, implementation principles and implementation effects thereof are similar, and no details will be repeated here.

Based on the inventive concept of any one of the above-described embodiments, at least one embodiment of the present disclosure further provides a display device, including a display module. The display module is the display module provided by any one of the above-described embodiments, implementation principles and implementation effects thereof are similar, and no details will be repeated here.

For example, the display device may be: a mobile phone, a tablet personal computer, a television, a monitor, a laptop, a digital photo frame, a navigator, and any other product or component having a display function. Other indispensable components of the display device will be understood by those skilled in the art, which will not be repeated here in detail, and should not be construed to limit the present disclosure.

Drawings of the embodiments of the present disclosure only refer to structures related to the embodiments of the present disclosure, and other structures may refer to general design.

The embodiments of the present disclosure provide the display module, the display device, and the viewing-angle switching method, wherein the display module includes the backlight module, the display panel, and the lower polarizer sheet, and further includes: the viewing-angle switching element and the transparent cover plate; the lower polarizer sheet is located between the backlight module and the display panel, the viewing-angle switching element and the transparent cover plate are arranged between the display panel and the lower polarizer sheet, the transparent cover plate is arranged on the side of the viewing-angle switching element that is close to the lower polarizer sheet; the backlight module is configured to provide light that meets the preset condition, and the viewing-angle switching element is configured to switch the viewing-angle modes of the display module; the viewing-angle modes include: the first viewing-angle mode and the second viewing-angle mode, and the viewing-angle range of the first viewing-angle mode is smaller than the viewing-angle range of the second viewing-angle mode. The technical solution provided by the present disclosure, by arranging the viewing-angle switching element configured to switch the viewing angle of the display module between the display panel and the transparent cover plate, avoids a relatively large gap between the viewing-angle switching element and the lower polarizer sheet, and can reduce the thickness of the display module, to further make the product light and thin.

The above is only exemplary embodiments of the present disclosure, and is not intended to limit the scope of protection of the present disclosure, which is determined by the appended claims.

The invention claimed is:

1. A display module, comprising: a backlight module, a display panel, a lower polarizer sheet, a viewing-angle switching element and a transparent cover plate, wherein the viewing-angle switching element and the transparent cover plate are arranged between the display panel and the lower polarizer sheet, and the transparent cover plate is arranged on a side of the viewing-angle switching element that is close to the lower polarizer sheet;
   the backlight module is configured to supply light that meets a preset condition, the viewing-angle switching element is configured to switch viewing-angle modes of the display module; the viewing-angle modes comprise: a first viewing-angle mode and a second viewing-angle mode; and a viewing-angle range of the first viewing-angle mode is smaller than a viewing-angle range of the second viewing-angle mode,
   the viewing-angle switching element comprises: a first transparent electrode, a second transparent electrode, and a viewing-angle switching layer;
   the viewing-angle switching layer is located between the first transparent electrode and the second transparent electrode; the first transparent electrode is located on a side of the viewing-angle switching layer that is close to the display panel; and the first transparent electrode and the second transparent electrode are configured to apply an electric field to the viewing-angle switching layer to change a state of the viewing-angle switching element;
   wherein the display module further comprises: a flexible circuit board, a first conducting wire, a second conducting wire, a third conducting wire, and a fourth conducting wire;
   the first conducting wire and the second conducting wire are arranged on a side of the display panel that is close to the viewing-angle switching element, and are respectively connected with the flexible circuit board;
   the third conducting wire connects the first conducting wire and the first transparent electrode; and the fourth conducting wire connects the second conducting wire and the second transparent electrode,
   the first conducting wire and the second conducting wire are further respectively arranged on two side surfaces of the display panel which are opposite to each other, and the second conducting wire is electrically connected with the flexible circuit board by wiring in the display panel.

2. The display module according to claim 1, wherein the preset condition is that a light emergent angle is less than or equal to 45 degrees.

3. The display module according to claim 1, wherein a material for fabricating the viewing-angle switching layer comprises: a polymer dispersed liquid crystal.

4. The display module according to claim 3, wherein states of the viewing-angle switching element comprise: a transparent state and a scattering state,
when the viewing-angle switching element is in the transparent state, the viewing-angle switching element is configured to cause light incident thereon to emerge along an incident direction, and the viewing-angle mode of the display module is the first viewing-angle mode; when the viewing-angle switching element is in the scattering state, the viewing-angle switching element is configured to scatter incident light, and the viewing-angle mode of the display module is the second viewing-angle mode.

5. The display module according to claim 3, wherein each of the first transparent electrode and the second transparent electrode is provided with a transparent insulating layer on a side away from the viewing-angle switching layer.

6. The display module according to claim 3, wherein the viewing-angle switching element further comprises a switcher sealant; and the switcher sealant connects the first transparent electrode and the second transparent electrode.

7. The display module according to claim 3, further comprising:
a sealant, provided between the display panel and the transparent cover plate, and encapsulating the viewing-angle switching element,
wherein the first transparent electrode and the second transparent electrode are located on a side of the sealant that faces the viewing-angle switching layer.

8. The display module according to claim 3, further comprising:
a sealant, provided between the display panel and the transparent cover plate, and encapsulating the viewing-angle switching element,
wherein the first transparent electrode and the second transparent electrode overlap with the sealant in an arrangement direction of the display panel and the backlight module.

9. The display module according to claim 1, further comprising a conductive first adhesive, wherein the first adhesive bonds the first conducting wire and the third conducting wire, and the first adhesive also bonds the second conducting wire and the fourth conducting wire.

10. The display module according to claim 1, further comprising a second adhesive, wherein the second adhesive bonds the viewing-angle switching element and the transparent cover plate.

11. The display module according to claim 1, further comprising a sealant, wherein the sealant is provided between the display panel and the transparent cover plate, and encapsulates the viewing-angle switching element.

12. The display module according to claim 1, further comprising: an optical adhesive and a sealant, wherein
the optical adhesive is located on a side of the viewing-angle switching element that is close to the transparent cover plate, and partially surrounds the viewing-angle switching element;
the sealant is provided between the display panel and the transparent cover plate, and encapsulates the optical adhesive.

13. The display module according to claim 1, wherein the backlight module comprises: a light source, a light guide plate and a reversing prism;
the light source is located on a light incident side of the light guide plate, and the reversing prism is located on a side of the light guide plate that is close to the display panel.

14. The display module according to claim 1, wherein the backlight module comprises: a light source configured to emit light that meets the preset condition;
the light source comprises: sub-millimeter light-emitting diodes arranged in an array.

15. The display module according to claim 1, wherein a distance between the lower polarizer sheet and the backlight module is 0.03 mm to 0.07 mm.

16. The display module according to claim 1, wherein the lower polarizer sheet is a multilayer reflective polarizer sheet.

17. The display module according to claim 1, wherein the lower polarizer sheet is located between the backlight module and the display panel.

18. A display device, comprising: the display module according to claim 1.

19. A viewing-angle switching method, applied to the display module according to claim 1, the method comprising:
controlling the viewing-angle switching element to switch the viewing-angle modes of the display module.

* * * * *